(12) United States Patent
Berry et al.

(10) Patent No.: US 6,515,688 B1
(45) Date of Patent: Feb. 4, 2003

(54) VIEWER INTERACTIVE THREE-DIMENSIONAL WORKSPACE WITH A TWO-DIMENSIONAL WORKPLANE CONTAINING INTERACTIVE TWO-DIMENSIONAL IMAGES

(75) Inventors: Richard Edmond Berry, Georgetown, TX (US); Scott Harlan Isensee, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 08/826,616

(22) Filed: Apr. 4, 1997

(51) Int. Cl.7 .................................................. G06F 3/00
(52) U.S. Cl. ...................................... 345/848; 345/764
(58) Field of Search ................................ 345/326, 334, 345/336, 339, 355, 356, 357, 884, 765, 705, 764, 848, 853, 854

(56) References Cited

U.S. PATENT DOCUMENTS 4,857,902 A    8/1989  Naimark et al.
5,012,433 A    4/1991  Allahan et al.
5,495,576 A    2/1996  Ritchey
5,555,354 A  * 9/1996  Strasnick et al. ....... 345/357 X
5,583,977 A   12/1996  Seidl
5,682,469 A  * 10/1997 Linnett et al. .......... 345/334 X
5,689,628 A  * 11/1997 Robertson ................... 345/355
5,689,669 A  * 11/1997 Lynch et al. ................ 345/355

* cited by examiner

Primary Examiner—Cao H. Nguyen
(74) Attorney, Agent, or Firm—J. B. Kraft; Mark E. McBurney; Leslie A. Van Leeuwen

(57) ABSTRACT

A system, method and computer program are provided for a virtual three-dimensional workspace wherein a two-dimensional workplane has been created in which two-dimensional images of said three-dimensional objects are carried so that when the viewer or user navigates within the three-dimensional workspace to points in the workspace where certain three-dimensional objects are no longer visible or available in the workspace, the viewer or user may still interactively perform functions relative to the no longer visible three-dimensional objects through interaction with the respective two-dimensional images of the three-dimensional objects which are still available in the workplane which is unaffected by the navigation.

3 Claims, 8 Drawing Sheets

VIEWER INTERACTIVE THREE-DIMENSIONAL WORKSPACE WITH A TWO-DIMENSIONAL WORKPLANE CONTAINING INTERACTIVE TWO-DIMENSIONAL IMAGES

CROSS-REFERENCE TO RELATED PATENT APPLICATIONS

The following three copending applications are related: the present application covering a three-dimensional workspace containing user interactive three-dimensional objects and means for carrying along functional two-dimensional images of corresponding selected objects in a two-dimensional workplane so that object functions are available through the two-dimensional images of such objects even when the workspace is navigated to points where the original three-dimensional objects are no longer visible in the viewpoint; a copending application entitled "VIEWER INTERACTIVE THREE-DIMENSIONAL OBJECTS AND TWO-DIMENSIONAL IMAGES IN VIRTUAL THREE-DIMENSIONAL WORKSPACE", Richard E. Berry et al. Ser. No. 08/826,618 filed Apr. 4, 1997; and an application entitled "VIEWER INTERACTIVE THREE-DIMENSIONAL WORKSPACE WITH INTERACTIVE THREE-DIMENSIONAL OBJECTS AND CORRESPONDING TWO-DIMENSIONAL IMAGES OF OBJECTS IN AN INTERACTIVE TWO-DIMENSIONAL WORKPLANE", R. E. Berry Ser. No. 08/826,617, filed Apr. 4, 1997.

TECHNICAL FIELD

The present invention relates to user interactive computer supported display technology and particularly to such user interactive systems and methods which are user friendly, i.e. provide even noncomputer literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/753,081, entitled "CREATING REAL WORLD OBJECTS" and Ser. No. 08/753,076, entitled "SYSTEM AND METHOD FOR MAINTAINING SIZE AND POSITION RELATIONSHIPS FOR NONRECTANGULAR REAL WORLD OBJECTS", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

A more recent copending application assigned to the Assignee of the present invention is entitled, "VIEWER INTERACTIVE OBJECT IN VIRTUAL THREE-DIMENSIONAL WORKSPACE", D. Bardon et al. (Attorney Docket No. AT9-96-310), which covers face views of virtual three-dimensional objects which may be triggered to appear on a display by interactive viewer input.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations.

In these virtual reality 3D environments as in the real world, the viewer or user is relating to the virtual objects in order to carry out a wide variety of tasks, some of which are quite simple and some very complex. In order for the user to stay focused and carry out his tasks as expeditiously as possible, it would be optimum for the virtual 3D system to provide simpler user interfaces for simple tasks and more comprehensive user interfaces for more complex tasks.

Thus, when the viewer's task is a simple one such as getting more information about a current movie film or about a newly released music CD, the user may be presented with his information in an interface as simple as a face view of a virtual 3D object which contains the information. For example, in the virtual 3D world or workspace, the viewer may navigate to a virtual three-dimensional object of a theater and get his desired movie film information from a face view of the object which presents a marquee of the theater. Similarly, the viewer seeking CD information might navigate to and be presented with a face view of a virtual CD vending kiosk which presents him with his desired information. The above-mentioned patent application, "VIEWER INTERACTIVE OBJECT IN VIRTUAL THREE-DIMENSIONAL WORKSPACE", D. B. Bardon et al., describes such face views of 3D virtual objects. With such simple tasks, the viewer notes his desired information, perhaps makes some simple choices and moves on with his navigation through the virtual 3D workspace.

On the other hand, the navigating viewer's task may be a more complex one like tracking and updating product sales information of a business or group of businesses or within a report or filing a tax statement.

The present invention permits the viewer or user to utilize conventional two-dimensional interfaces within his three-dimensional virtual reality workspace simultaneously with his continued navigation through his three-dimensional workspace.

SUMMARY OF THE INVENTION

Before setting forth the present invention, we should establish some basic characteristics of the virtual three-dimensional environment as described in the above-referenced patents and applications. It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused.

As set forth above, it is easier for the viewer to stay focused when the task for which he is accessing the object is a simple one. The present invention deals with helping viewers to stay focused in more complex tasks.

The present invention operates within the previously described data processor controlled display system for displaying a virtual three-dimensional workspace having three-dimensional objects which are interactively functional, i.e. may be picked by the viewer or user for various computer interactive functions.

A key aspect of the present invention is the provision of a two-dimensional workplane. This workplane is displayed in a planar position in said virtual three-dimensional workspace usually parallel to the plane of the display surface and preferably at the front of the three-dimensional workspace.

In addition, there is associated with and stored for each of a plurality of the functional virtual three-dimensional objects, at least one planar two-dimensional image of the virtual object, i.e. the two-dimensional image has sufficient visual similarity to the object which it represents that the viewer or user will intuitively connect the two as he addresses the three-dimensional workspace. The system provides user interactive means so that the user can select one of the virtual objects and means responsive to such a user selection for displaying the two-dimensional planar image associated with the selected object within the two-dimensional workplane.

The system further provides user interactive means permitting the user to functionally access the two-dimensional images within said workplane.

A key aspect of the present invention is that the interactive two-dimensional image remains within the workplane and the workplane does not change as a result of viewer navigation within the three-dimensional workspace.

When the user has navigated to a new viewpoint in the three-dimensional workspace, the user may select another virtual three-dimensional object and its corresponding two-dimensional image will appear in the two-dimensional workplane. In this manner, the user may navigate through an extensive three-dimensional workspace while designating various three-dimensional objects, the two-dimensional images of which are then displayed in the two-dimensional workplane and thus are interactively accessible to the user. In other words, the selected three-dimensional objects are carried along during the navigation as their corresponding two-dimensional image. This makes it possible to perform functions related to three-dimensional objects in portions of the workspace beyond the visible positions of the designated three-dimensional objects by the user functionally accessing the two-dimensional images of such objects.

In order to understand the present invention, it is important its advantages over conventional two-dimensional systems be considered. In such two-dimensional systems, the potential functions and applications of the display systems are represented by an array of icons which the user may respectively select in order to bring forth particular computer functional application interface on the display. Other than representing a particular computer function or program, these conventional two-dimensional icons of the prior art do not act in combination with other elements as do the three-dimensional object of the present invention to provide interrelated three-dimensional environment through which the viewer may navigate. Such a three-dimensional virtual workspace environment permits even the most complex of computer setups to be intuitively organized with respect to the viewer so that the viewer may navigate and make appropriate selections and combinations of selections.

DETAILED DESCRIPTION OF THE PREFERRED EMBODIMENT

Figure 1:
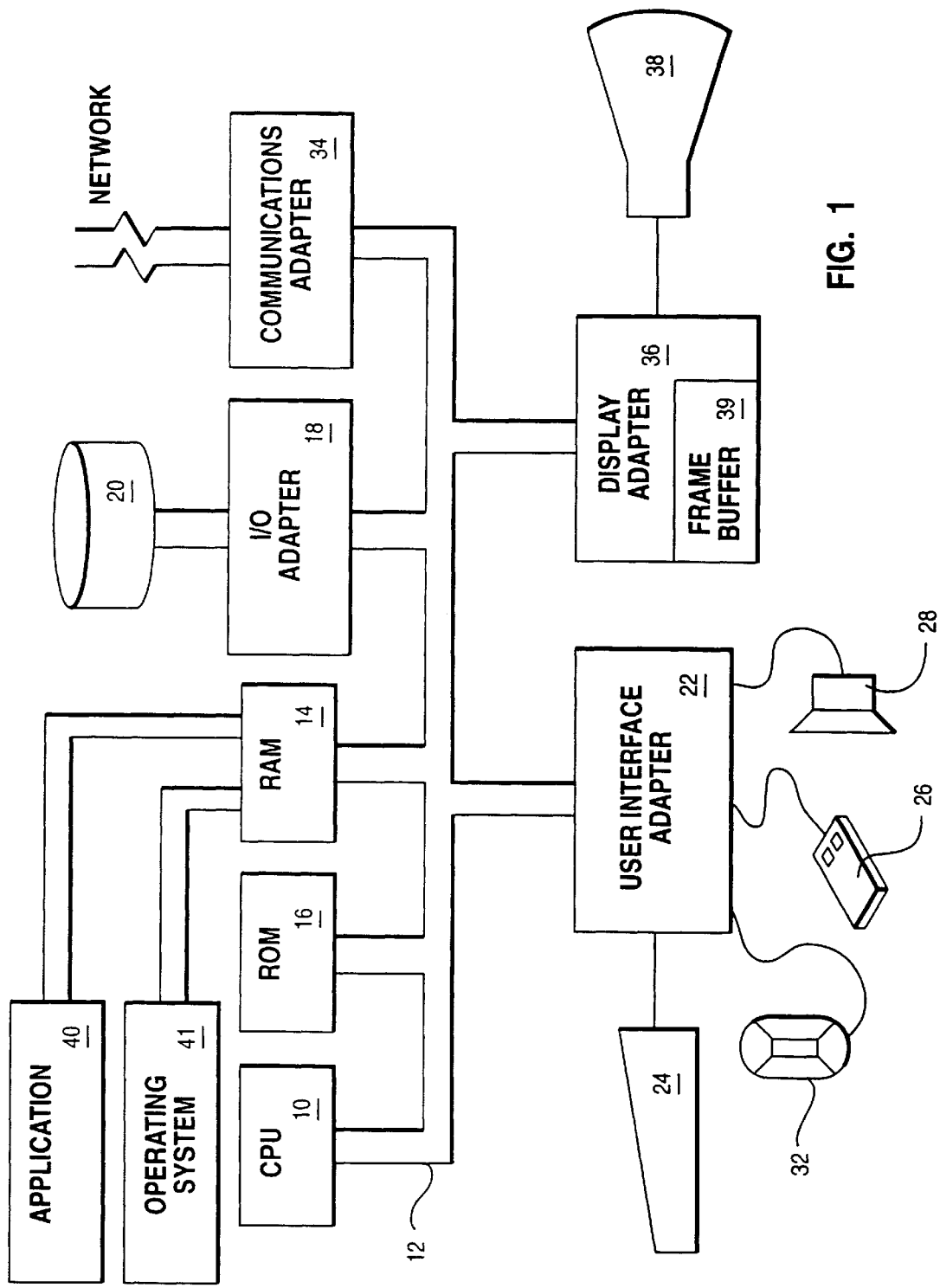
FIG. 1 is a block diagram of a data processing system including a central processing unit which is capable-of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The description of the present invention often refers to navigation within the three-dimensional virtual workspace. The workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The three-dimensional objects which will be subsequently described in embodiments of the present invention may be best implemented using object oriented programming techniques, such as the object oriented techniques described in the above-mentioned copending application Ser. No. 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing.

Therefore, those skilled in the art will understand how the present invention is implemented using object oriented programming techniques as described above.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation application program 40 such as the previously described VRT of Superscape in the RAM 14 of the system of FIG. 1. Also stored on the RAM will be a suitable operating system 41 such as DOS or Windows.

Figure 2:
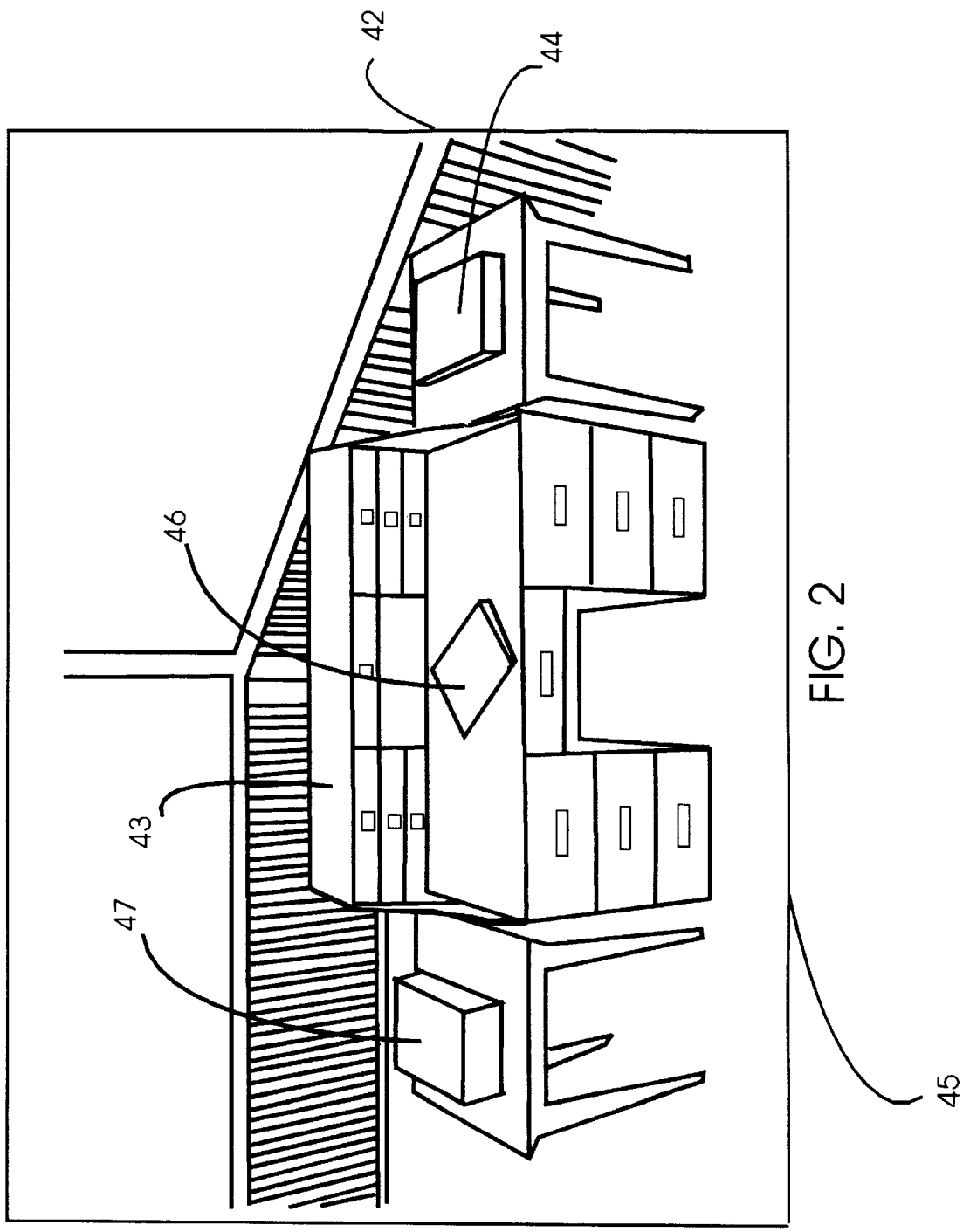
FIG. 2 shows a typical virtual reality workplace in accordance with the present invention at an initial viewpoint.

An embodiment of the present invention will now be escribed with respect to the virtual reality workspace shown in FIG. 2. The workspace 42 is shown as an office environment with a desk 43, as well as a telephone answering machine 44, as well as other office equipment and tables which need not be described here. On the desk 43 is a book 46. The workspace 42 is centered within a viewpoint interface 45 which is presented to the viewer on display monitor 38 of FIG. 1. In accordance with conventional techniques, the user may control the viewpoint 45 through a conventional I/O device such as mouse 26 or FIG. 1 which operates through the user interface 22 of FIG. 1 to call upon VRT programs in RAM 14 operating with the operating system 41 to create the images in frame buffer 39 of display adapter 36 to control the display on monitor 38. Using conventional virtual three-dimensional workspace navigation techniques, the viewpoint interface 45 of FIG. 2 is changeable as the viewer moves closer or backs away from objects in the workspace or moves to right or to the left in the workspace. All this may be controlled by a suitable I/O device such as mouse 26 of FIG. 1. The previously mentioned devices within workspace 42 are functional three-dimensional objects such as book 46, telephone answering equipment 44 or dictation player 47. The images for these various objects are stored as data from which the objects may be created on the display in RAM 14 of FIG. 1 in connection with the VRT program.

Figure 3:
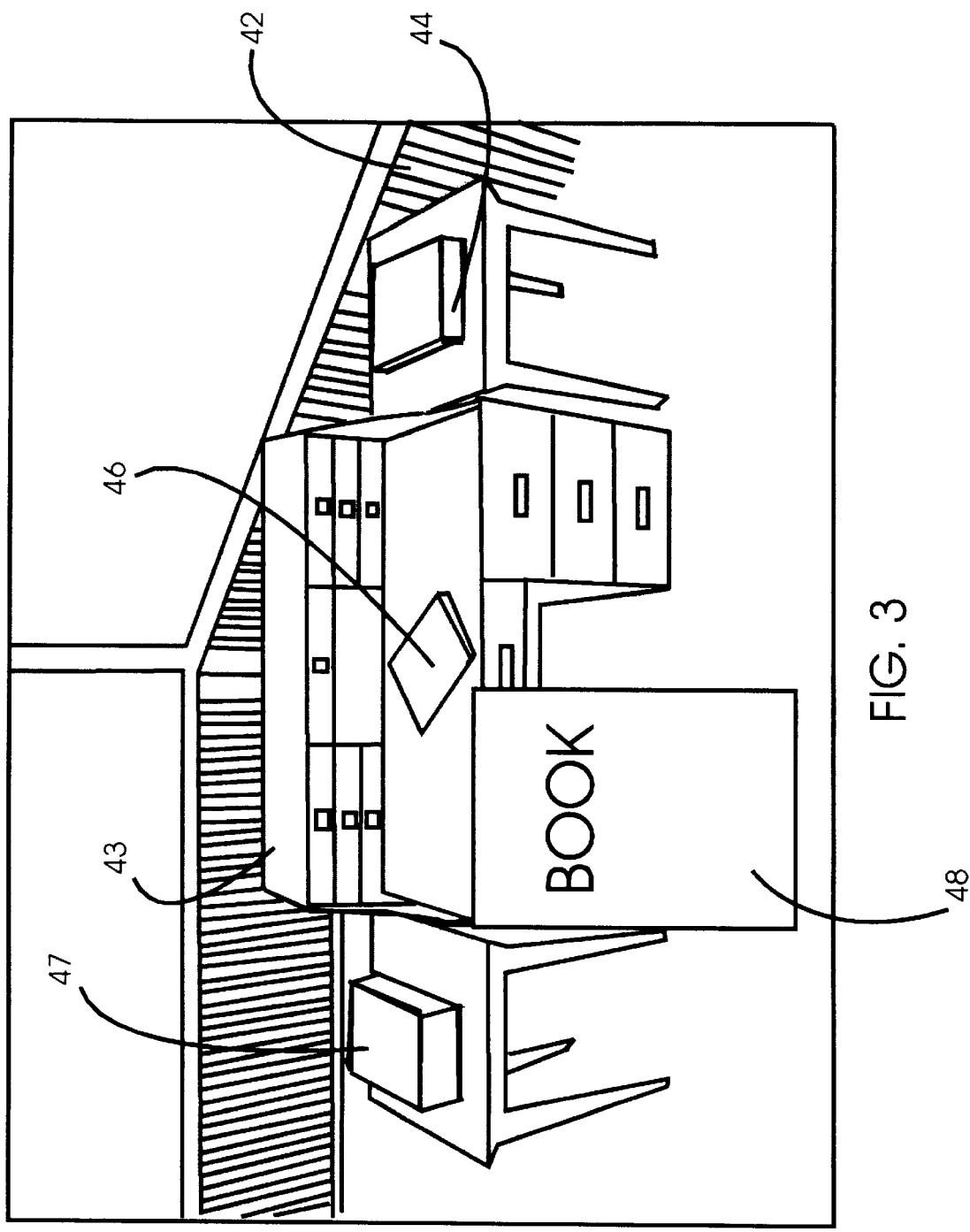
FIG. 3 is a representation of an initial planar two-dimensional workplane set up in front of the three-dimensional workspace of FIG. 2 and containing a two-dimensional image of selected objects, the book.
Figure 4:
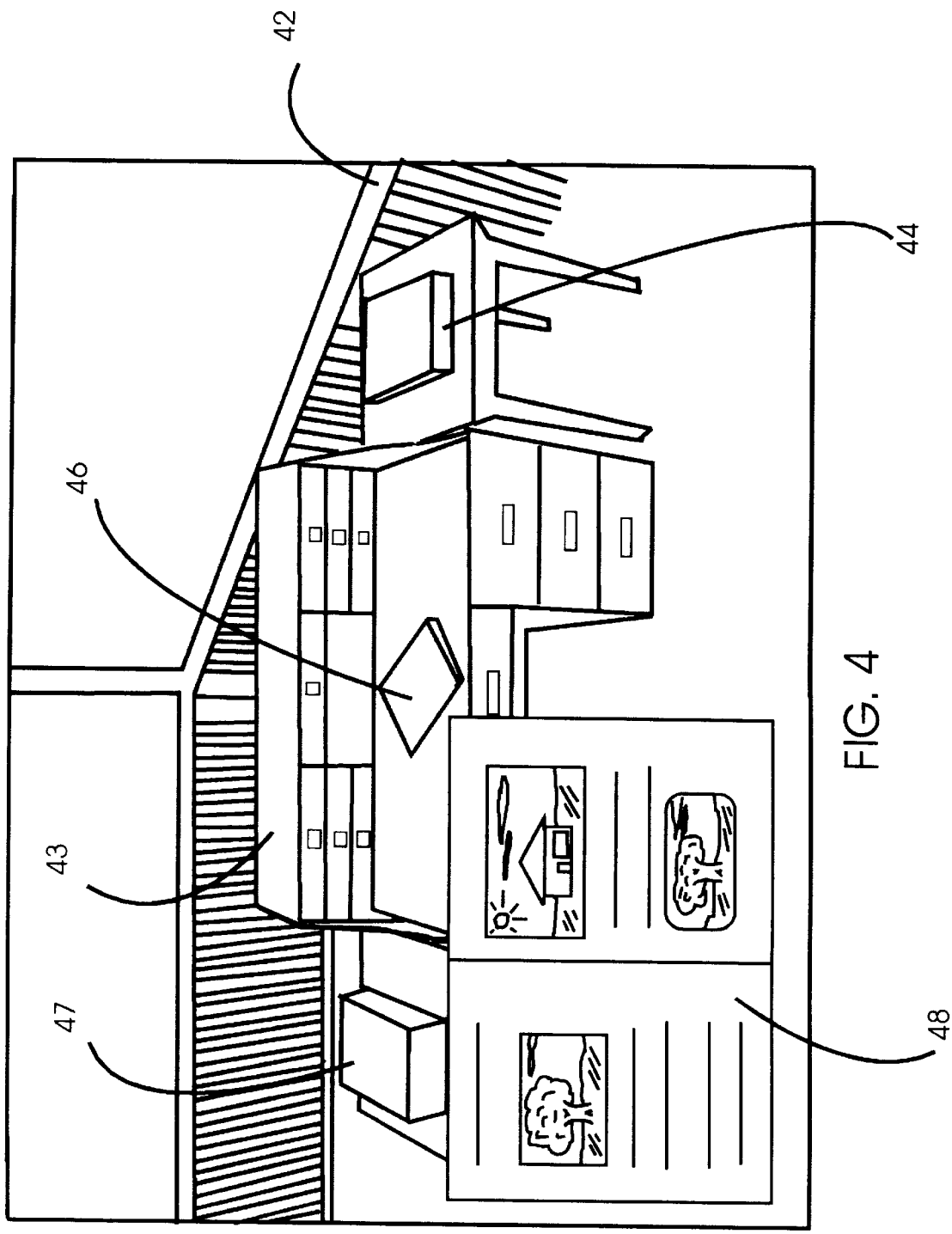
FIG. 4 is the representation of FIG. 3 wherein the user has interactively addressed the two-dimensional book image.

Let us assume that a user or viewer is navigating through a three-dimensional workspace in which viewpoint 45 of FIG. 2 is only a stage in the navigation. When the viewer reaches viewpoint 45 of FIG. 1, the viewer has a need to have some present and future access to written material which is recorded in a book such as that represented by book object 46. The viewer at this point is also aware that as he continues his navigation through the workspace, he will continue to need to refer to reference materials contained in or recorded in the book. He needs a means of carrying along with him as he proceeds with his navigation through the workspace, continued access to the written material contained in the book so that after he has navigated through the workspace wherein book object 46 is no longer visible, he will not have to back track through the workspace until he reaches book object 46 again and may access it. The present invention permits the user to carry along a two-dimensional representation of book object 46 so that the book may continue to be accessible to the user therein even after he has navigated past book object 46. The system provides for the viewer selection of book object 46 through some appropriate pointing device such as mouse 26 in FIG. 1. When the viewer clicks onto book using the mouse 26 in FIG. 1, the result is that shown in FIG. 3; a planar two-dimensional image as shown in FIG. 3 of the book appears on the display screen in front of its three-dimensional workspace 42. The book is in a two-dimensional workplane which is virtually up against the surface of the monitor in which the view is being displayed and arranged so that the angle of the viewpoint would be directly perpendicular to the plane. The workplane itself is transparent so that the viewer or user may continue to use objects in the three-dimensional workspace, but when an object such as book 46 is selected its image is planar and live within this invisible workplane. The image 48 of book 46 is functionally interactive, i.e. a user by suitable means such as clicking with mouse 26 of FIG. 1 may turn the pages in the book to access the material he desires therein. With reference to FIG. 4, the two-dimensional book image is shown after several of the pages have been interactively turned to a particular position in the book page hierarchy.

A key to the present invention is that the viewer may interactively relate to objects in the two-dimensional workplane while the three-dimensional world behind the workplane remains active and navigable. More particularly, the present invention relates to the concept that as the viewer travels, i.e. navigates, through the three-dimensional workspace, he may carry along with him a variety of object functions even when he has navigated beyond where the three-dimensional objects representative of those functions have disappeared from the three-dimensional workspace. In the illustration which is being described with respect to FIG. 4, we have already assumed that the viewer or user wants to carry book 48 image function along with him in his navigation or travels.

Let us also assume that he is expecting or needs access to telephone services, as represented by three-dimensional object 44 which is a telephone answering machine. He then selects, as previously described with respect to book 46, the telephone equipment 44 by, let us say, clicking on it. As a result of this selection, FIG. 5, a two-dimensional image of the telephone equipment 49 which is fully functional appears in the previously described transparent two-dimensional workplane alongside of two-dimensional operative image of book 48. Both of these two-dimensional images are fully functional, i.e. book may be used to look up reference material and the telephone image 49 may be used for answering calls or leaving messages, etc.

Figure 5:
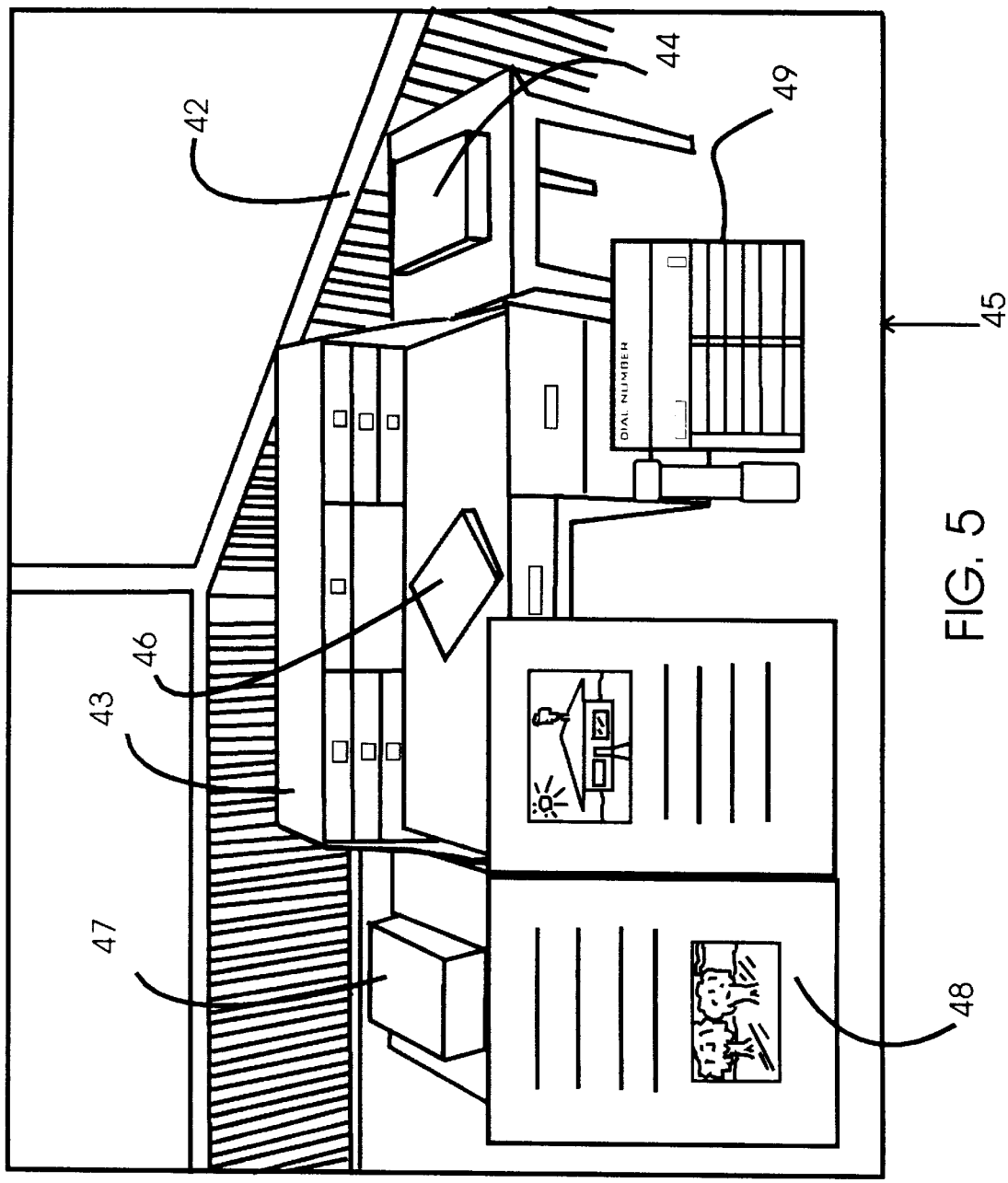
FIG. 5 shows the workspace of FIG. 4 wherein an additional two-dimensional image of telephone answering equipment has been selected and entered into the two-dimensional workplane.
Figure 6:
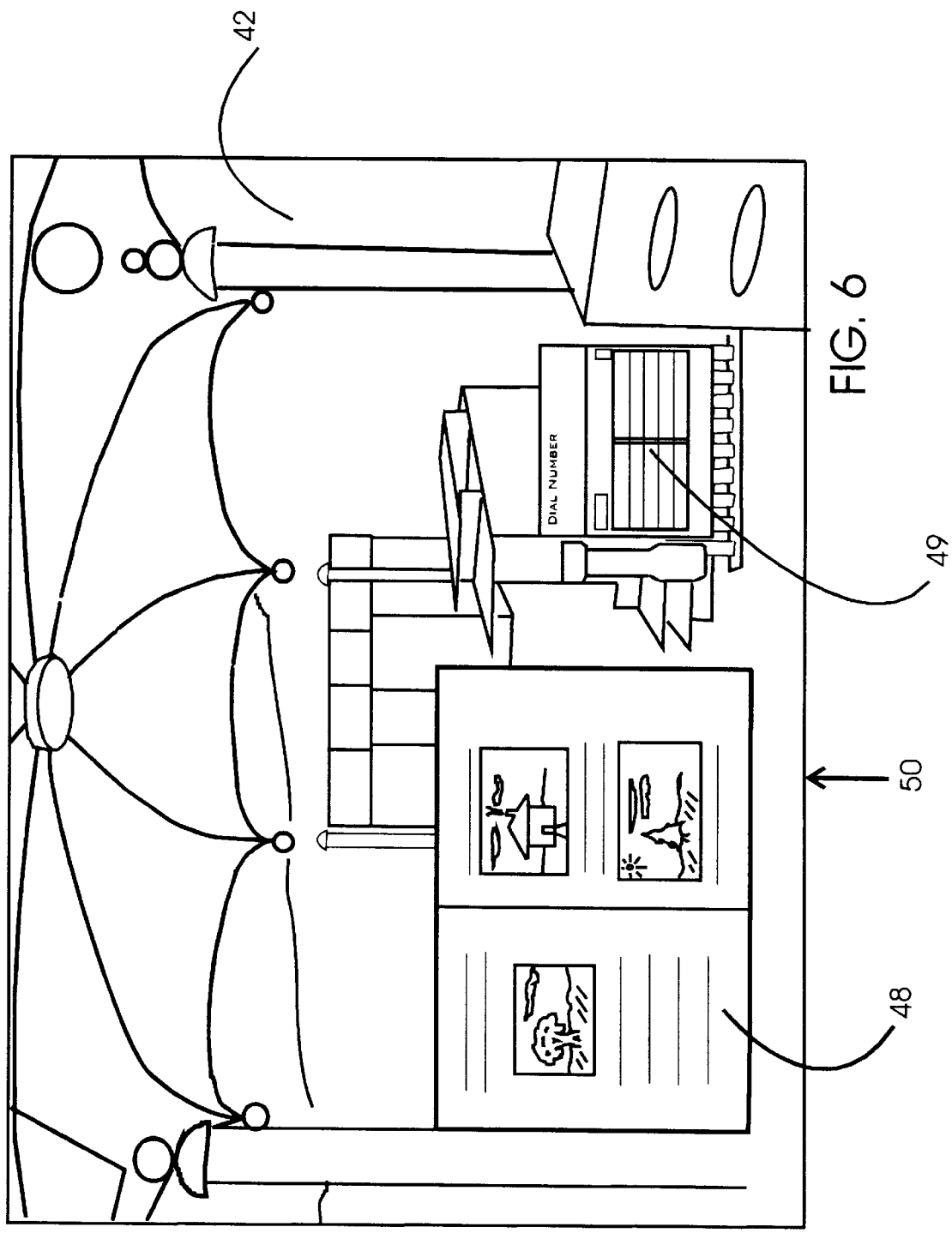
FIG. 6 is the workspace of FIG. 5 wherein the viewpoint has been changed to a subsequent position through navigation.

As a result, when the viewer or user has navigated from the viewpoint 45 of FIG. 5 to viewpoint 50 in FIG. 6, the workplane carrying two-dimensional functional images 48 of the book and 49 of the telephone answering equipment has followed the viewer during the navigation carrying along with it the two-dimensional functional images 49 and 50 which are available to the viewer or user even though the three-dimensional objects representative of those functions in the previous landscape, i.e. book object 46 and telephone answering object 44 have disappeared from the new viewpoint shown in FIG. 6.

Figure 7A:
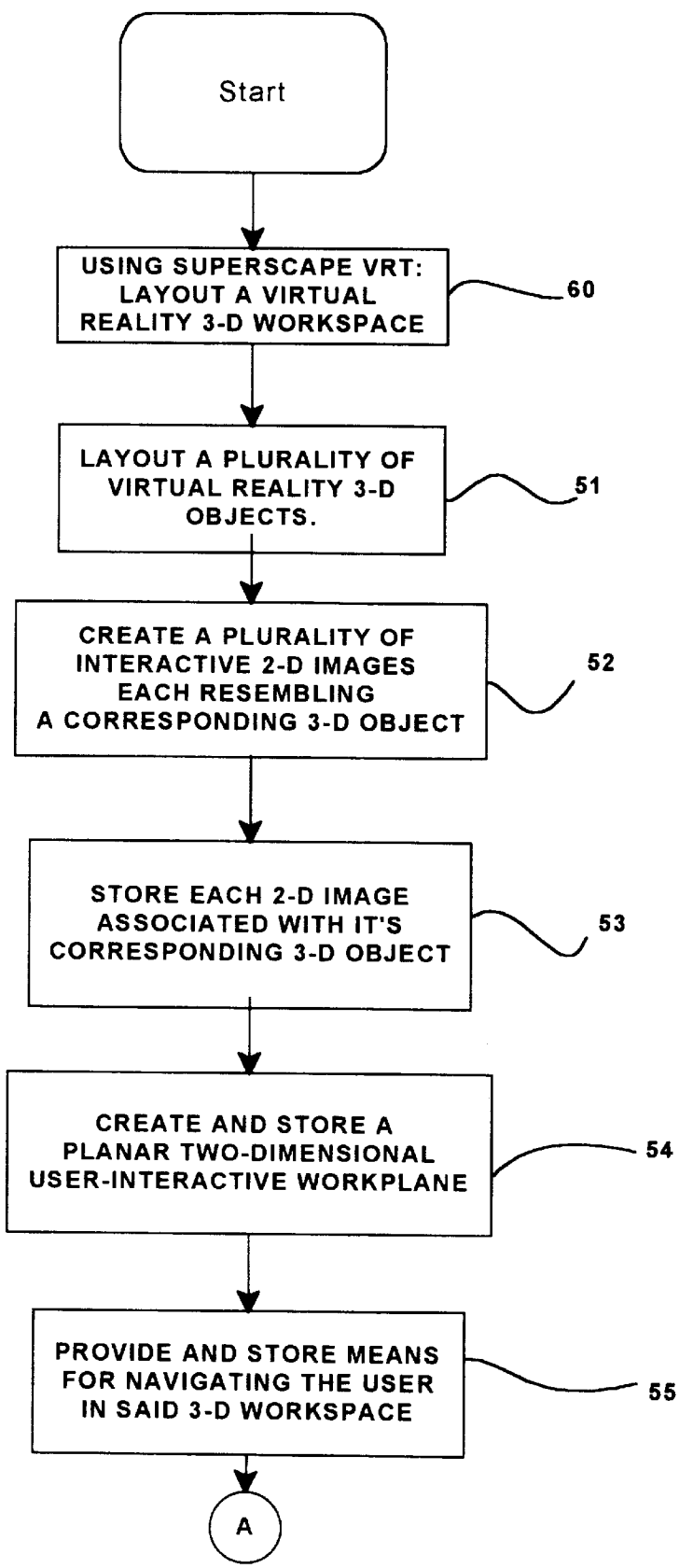
FIGS. 7A and 7B are flowcharts of a process implemented by the present invention for carrying out the present invention.
Figure 7B:
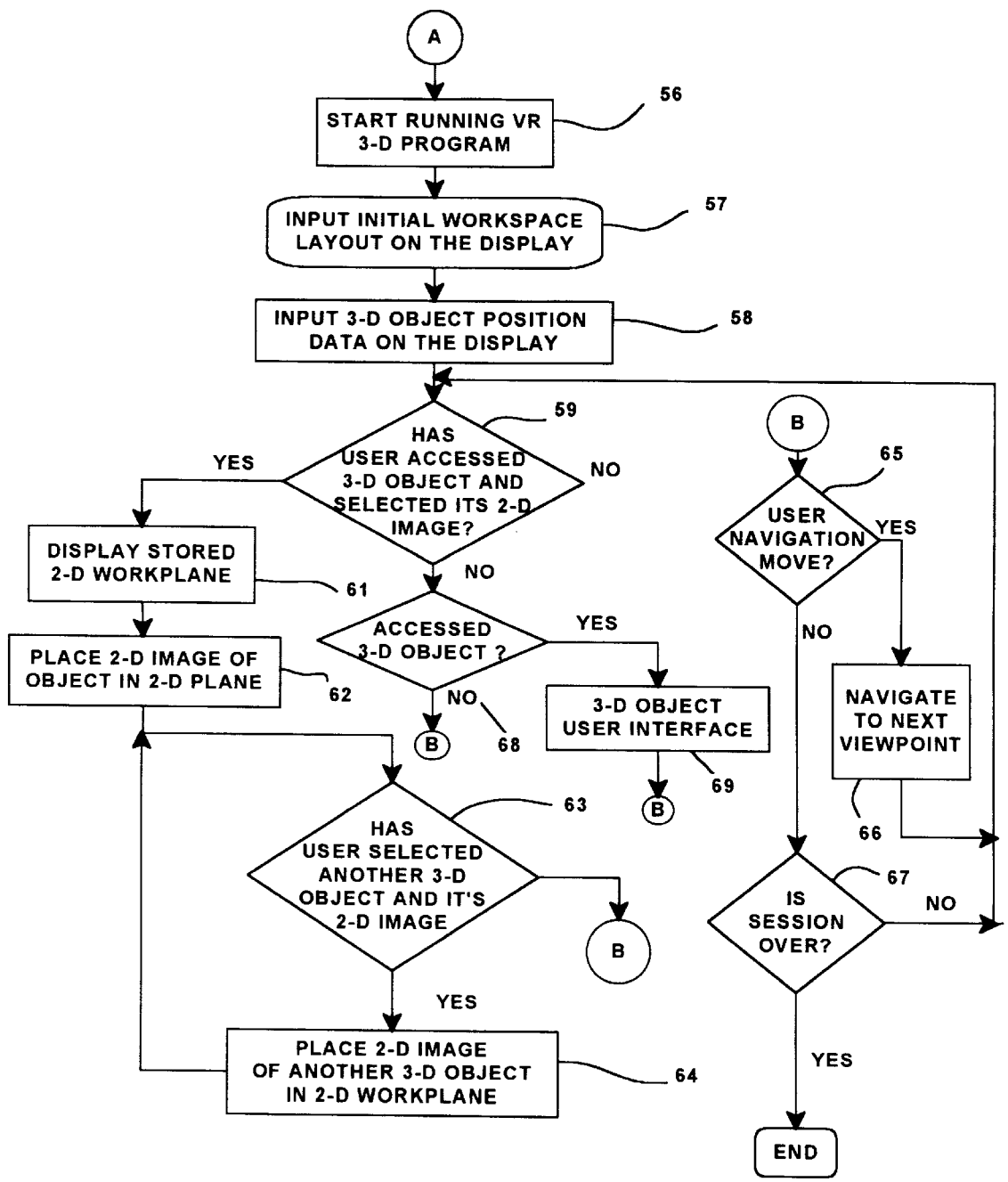

Now with reference to FIGS. 7A and 7B, we will describe a process implemented by the present invention in conjunction with the flowcharts of FIGS. 7A and 7B. The flowcharts are in two parts: the steps in FIG. 7A relate to the development of the virtual reality landscape objects, the application programs with which particular objects are associated, as well as the two-dimensional interactive user interfaces provided for such application programs. The developments are made in accordance with the present invention using the previously described Superscape VRT object oriented programming toolkit.

First, step 60, FIG. 7A, the virtual reality three-dimensional workspace, for example workspace 42, FIG. 2, is created and stored. Next, step 51, the virtual reality 3D objects are created and stored. These would include the object oriented code representation of such objects as book 46, telephone answering machine 44 or dictation player 47 in FIG. 2.

Next, step 52, the programmer will design or create a plurality of two-dimensional user interactive images each respectively resembling a corresponding three-dimensional object. By resembling we mean that the two-dimensional image must be such that the user of the system will intuitively understand that the two-dimensional image represents the three-dimensional object and its function. Then, step 53, each two-dimensional interactive image is stored associated with the three-dimensional object which it represents. Next, step 54, a planar two-dimensional user interactive workplane is created and stored by the designer. As previously mentioned, this two-dimensional workplane is essentially invisible. However, during the design it is designated a position in the workspace, such as workspace 42, which is essentially at the front of the workspace and in a parallel plane to which the direction of the viewpoint is substantially perpendicular. Then, step 55, a conventional means is provided for navigating through the virtual reality three-dimensional workspace 42 in FIGS. 2 through 6 using, for example, the navigation technique of changing the viewpoint, such as viewpoint 45 in FIGS. 2 through 5 to viewpoint 50 in FIG. 6.

The process now proceeds to point A in FIG. 7B whereat the created virtual reality workspace program is run, step 56. As previously mentioned, the program is run on a system such as that shown in FIG. 1 with the particular application program 40 herein being loaded on RAM 14 and connected to display adapter 36 which forms the stored images via frame buffer 39 controlling display monitor 38. The program initially sets up the workspace layout on the display as well as the object layout and the positions of the objects in the workspace, steps 57 and 58.

At this point we will proceed to the aspect of the program applicable to the present invention. First, in decision block 59, the system determines whether the viewer or user has as yet accessed a three-dimensional object and selected to bring up its two-dimensional image. If there has been such a selection, e.g. book object 46 in FIG. 2 or telephone object 44 in FIG. 5, the system sets up the stored two-dimensional workplane in its position, step 61, at the front of workspace 42 and, step 62, the functional two-dimensional image of the book, image 48, is setup in this two-dimensional workplane as shown in FIGS. 3 and 4. Once the initial workplane is setup and the initial image is setup in the workplane, steps 61 and 62, the process then proceeds to decision step 63 where a determination is made as to whether an additional three-dimensional object has been selected to have its functional two-dimensional image put into the two-dimensional workplane. Where this selection is yes as in the selection of telephone answering object 44, FIG. 5, the system proceeds to step 64 wherein the two-dimensional functional interactive image of the three-dimensional object is placed in the two-dimensional workplane such as telephone answering object 49 in FIG. 5 being placed in the two-dimensional workplane to join two-dimensional functional image 48 of the book which is already in the workplane. When this is done, the system returns to decision step 63 where a determination is made as to whether other three-dimensional objects are selected to have their functional two-dimensional image placed in the workplane. Where the user has selected all of the functional two-dimensional images he desires to carry along with him in the two-dimensional workplane during navigation, the system then proceeds to decision block 65 via point B where a determination is made as to whether the user wishes to navigate further, i.e. change the viewpoint. If the user wishes to change the viewpoint, then the system proceeds to step 66 where the system navigates to the next viewpoint. This is the transition from viewpoint 45 as shown in FIG. 5 to viewpoint 50 as shown in FIG. 6. During such a navigation in the three-dimensional space, the functional interactive book image 48 as well as the functional two-dimensional interactive image 49 of the telephone answering equipment is carried along to the next viewpoint shown in FIG. 6 from which the objects respectively represented by these two-dimensional functional images, i.e. book object 46 and telephone answering object 44 have disappeared. However, the respective two-dimensional images of these objects, book image 48 and telephone answering equipment image 49, remain accessible to the viewer for carrying out various interactive functions relative to such images.

After the navigation to the next viewpoint has been completed, the system then loops back to decision block 59 where a decision is made as to whether the viewer has accessed any further three-dimensional objects to select its respective two-dimensional functional image at the workspace shown in the new viewpoint. On the other hand, if the decision from navigation decision block 65 is that there is no further navigation, the system then proceeds to decision block 67 where a determination is made as to whether the session is over. If the session is still on, it is not over, the system again loops back to decision block 59 and further determination is made as to whether any additional three-dimensional objects have been selected. Now, if the decision from decision block 59 is there are no further three-dimensional objects selected for their two-dimensional images, the system proceeds to decision block 68 where a determination is made as to whether a three-dimensional object has been selected for a three-dimensional interface. If yes, then, block 69, a three-dimensional viewpoint interface is established for object, after which the system branches to navigation decision block 65 via point B. If there is a no decision from block 68, then the system branches directly to navigation decision block 65 via point B.

Although certain preferred embodiments have been shown and described, it will be understood that many changes and modifications may be made therein without departing from the scope and intent of the appended claims.

What is claimed is:

1. A data processor controlled display system for displaying a virtual three-dimensional workspace comprising:

means for displaying a plurality of virtual three-dimensional objects in and environmentally associated with said virtual workspace;

means for storing for each of said virtual objects, a user interactive two-dimensional image of said virtual object;

means for displaying a two-dimensional user interactive workplane within said three-dimensional workspace;

user interactive means for navigating within said three-dimensional workspace to a plurality of said virtual objects, said means for navigating not affecting said two-dimensional workplane or said plurality of interactive two-dimensional images in said workplane;

user interactive means for selecting said plurality of virtual objects; and means responsive to said selecting means for displaying a plurality of said interactive two-dimensional images of said plurality of selected virtual objects in said two-dimensional workplane.

2. A data processor implemented method for displaying a virtual three-dimensional workspace comprising:

displaying a plurality of virtual three-dimensional objects in and environmentally associated with said virtual workspace;

storing for each of said virtual objects, a user interactive two-dimensional image of said virtual object;

displaying a two-dimensional user interactive workplane within said three-dimensional workspace;

user interactively navigating within said three-dimensional workspace to a plurality of said virtual objects, said means for navigating not affecting said two-dimensional workplane or said plurality of interactive two-dimensional images in said workplane;

user interactively selecting said plurality of virtual objects; and displaying a plurality of said interactive two-dimensional images of said plurality of selected virtual objects in said two-dimensional workplane in response to said user selection.

3. A computer readable program having data structures included on a computer readable medium which causes the display on a data processor controlled display of a virtual three-dimensional workspace comprising:

means for displaying a plurality of virtual three-dimensional objects in and environmentally associated with said virtual workspace;

means for storing for each of said virtual objects, a user interactive two-dimensional image of said virtual object;

means for displaying a two-dimensional user interactive workplane within said three-dimensional workspace;

user interactive means for navigating within said three-dimensional workspace to a plurality of said virtual objects, said means for navigating not affecting said two-dimensional workplane or said plurality of interactive two-dimensional images in said workplane;

user interactive means for selecting said plurality of virtual objects; and means responsive to said selecting means for displaying a plurality of said interactive two-dimensional images of said plurality of selected virtual objects in said two-dimensional workplane.

\* \* \* \* \*